United States Patent
Mathews

[15] 3,676,758
[45] July 11, 1972

[54] MOVING COIL DIRECT CURRENT RECIPROCATING MOTOR

[72] Inventor: Joseph W. Mathews, 3762 Swansea Drive, Mobile, Ala. 36609

[22] Filed: July 9, 1970

[21] Appl. No.: 53,478

Related U.S. Application Data

[63] Continuation-in-part of Ser. No. 858,942, Sept. 18, 1969, Pat. No. 3,575,649, which is a continuation-in-part of Ser. No. 542,116, April 12, 1966, Pat. No. 3,469,163.

[52] U.S. Cl. ............................. 318/128, 318/132, 310/27
[51] Int. Cl. ....................................................... H02k 33/18
[58] Field of Search ............... 318/128, 119, 127, 130, 132; 310/13, 27, 34, 35

[56] References Cited

UNITED STATES PATENTS

| | | |
|---|---|---|
| 2,297,084 | 9/1942 | Swallow ........................ 318/132 X |
| 3,417,268 | 12/1968 | Lace ................................ 310/27 |
| 387,310 | 8/1888 | Mather ............................ 310/27 |
| 2,753,470 | 7/1956 | Armstrong ...................... 310/34 |
| 2,931,925 | 4/1960 | Doltz .............................. 310/27 |

Primary Examiner—D. F. Duggan
Attorney—Giles C. Clegg, Jr.

[57] ABSTRACT

A direct current motor having a coil moving in a magnetic field to provide force to drive a piston in one direction and a spring for driving the piston in the opposite direction. A circuit is provided for controlling the flow of current through the coil, including a transistor connected in series with the coil and a d.c. source. A capacitor whose state of charge varies as a function of the back EMF generated by the coil is connected for controlling the conductivity state of the transistor as a function of the capacitor's state of charge.

25 Claims, 14 Drawing Figures

INVENTOR
Joseph W. Mathews

BY
ATTORNEY

Fig. 9

INVENTOR
Joseph W. Mathews

INVENTOR
JOSEPH W. MATHEWS

ATTORNEY 3,676,758

MOVING COIL DIRECT CURRENT RECIPROCATING MOTOR

CROSS REFERENCE TO RELATED APPLICATIONS

This application is a continuation-in-part of my co-pending application Ser. No. 858,942, filed Sept. 18, 1969, now U.S. Pat. No. 3,575,649 which is a continuation-in-part of my application Ser. No. 542,116, filed Apr. 12, 1966, now U.S. Pat. No. 3,469,163.

BACKGROUND OF THE INVENTION

The present invention relates to direct current motors and more particularly to an improved direct current motor which utilizes a spring and electro-magnetic forces to produce reciprocating motion of a force transmitting member.

The present invention provides a brushless motor that is capable of converting low voltage direct current energy into reciprocating mechanical energy at a relatively high efficiency. In accordance with the principles of the present invention, there is provided a permanent magnet having an air gap that receives a coil. The coil is supported for oscillatory movement relative to the permanent magnet. Either the coil or magnet can be supported by the frame of the motor with the other moving relative thereto, although considerations including the relative mass of the coil and magnet renders it desirable that the coil be supported for oscillatory movement relative to the permanent magnet.

There is also included a control circuit for applying direct current to the coil with the current flowing in a direction to produce magnetic flux that interacts with the magnetic flux associated with the permanent magnet to produce a force to move the coil longitudinally along the axis of the coil in one direction relative to the air gap. The control circuit includes means effective to cause the current flowing in the one direction to be greater as the coil moves in the one direction from an initial position than as the coil is returned to the initial position. A spring returns the coil in the opposite direction and controls the excursion of the coil.

In accordance with the preferred embodiment of the invention, the coil is of cylindrical configuration. The coil is supported such that it is free to move axially in the air gap and any movement normal to its axis is restricted in order that the length of the air gap may be minimal yet permit acceptance of the coil. Further, in accordance with the preferred embodiment of the invention, a transistor which is controlled responsive to the back EMF (electromotive force) generated in the coil is utilized for selectively applying pulses of direct current to the coil to drive the coil in the one direction. The motor is especially useful with reciprocating loads wherein the force required to drive the load in one direction is greater than the force required to drive the load in the opposite direction.

Many objects and advantages of the invention will become readily apparent to those skilled in the art as the following detailed description of a preferred embodiment of the same unfolds when taken in conjunction with the appended drawings wherein like reference numerals denote like parts and in which:

Turning now to the drawings, a motor in accordance with the one embodiment of the invention is designated generally by the reference numeral 10. It includes a magnetic structure 12 and a coil 14. Two rod members 16 and 18 depend from the lower surface 20 of the magnetic structure 12 and support plate members 22 and 24. The electrical components utilized in the control circuitry are suitably mounted on the plate member 22, but are not shown in FIG. 1 of the drawings, as to do so would unduly complicate the drawing. A pair of batteries 26 and 28 are mounted to the plate member 24 by bracket assemblies 30 and 32, respectively. Batteries 26 and 28 are preferably of the nickel cadmium type in order that they may be recharged and suitably are connected in series such that the voltage available to drive the motor is approximately 2.5 volts. It will be appreciated that as many batteries as are required to obtain a desired voltage level can be provided and that voltages greater than 2.5V can be used.

Figure 1:
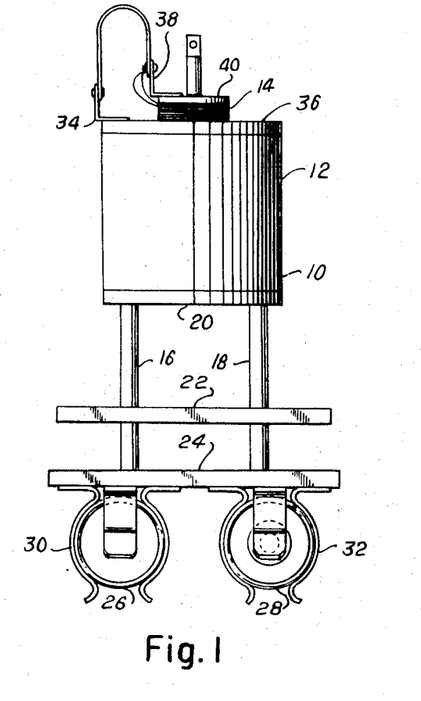
FIG. 1 is a side elevation view of one embodiment of the present invention.

An L-shaped member 34 is mounted to the upper surface 36 of magnetic structure 12 and, similarly, an L-shaped bracket member 38 is mounted to the upper surface 40 of coil 14. Extending between bracket member 34 and bracket member 38 is a pair of resilient conductor members 42 and 44, suitably formed of beryllium copper. Bracket members 34 and 38 are suitably formed of an insulating material at the points of contact with the members 42 and 44. Electrical conductors (not shown) extend from the bracket member 34 to the electrical control circuitry mounted on the plate 22, one of the electrical conductors contacting each of the members 42 and 44, respectively. One end of coil 14 is connected to the member 42, the other end being connected to member 44. Electrical connection is, therefore, provided between the coil 14 and electrical control circuitry.

Figure 2:
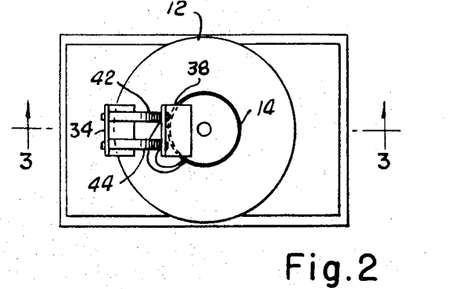
FIG. 2 is a plan view further illustrating the motor of FIG. 1.
Figure 3:
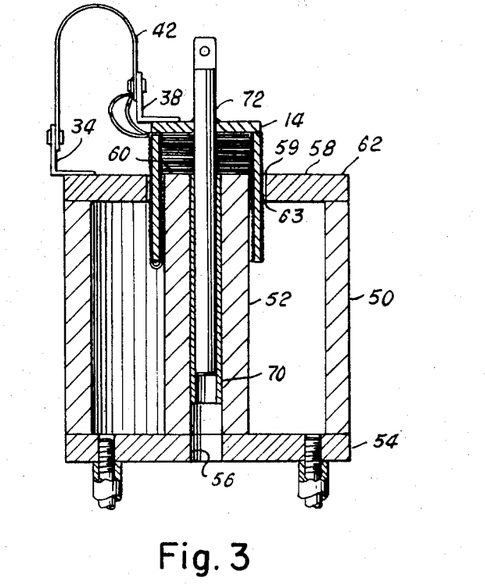
FIG. 3 is a cross sectional view taken along line 3—3 of FIG. 2.
Figure 4:
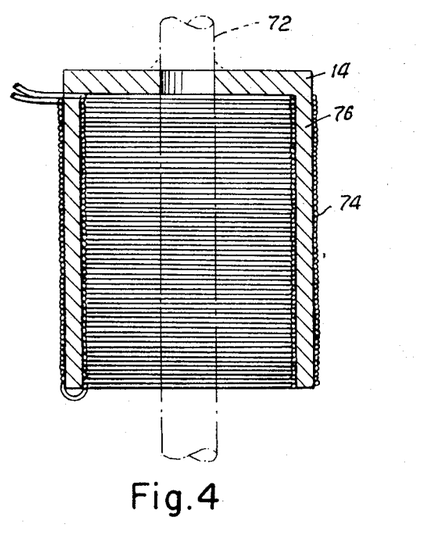
FIG. 4 is a view similar to FIG. 3, but illustrating the coil in accordance with the preferred embodiment of the invention in enlarged form.

As best shown in FIG. 3, the magnetic structure 12 suitably comprises a first cylindrical member 50 and a second cylindrical member 52 whose outside diameter is substantially smaller than the inside diameter of the cylindrical member 50. There is also provided a first annular member 54 whose outside diameter is substantially the same as the outside diameter of the cylindrical member 50 and whose walls are substantially the same thickness. Annular member 54 includes an annulus 56 of substantially the same diameter as the inside diameter of the cylindrical 52. Cylindrical members 50 and 52 are mounted onto the annular member 54 such that the opening of the cylindrical member 52 is aligned with the annulus 56 of annular member 54, with cylindrical member 50 concentrically surrounding the cylindrical member 52. There is also provided a second annular member 58 having an outside diameter of substantially the same as the outside diameter of the cylindrical member 50. The annular member 58 includes an annulus 59 of slightly greater diameter than the outside diameter of cylindrical member 52 and of a thickness substantially the same as the thickness of cylindrical member 50. The cylindrical member 52 is suitably of greater length than cylindrical member 50 by an amount equal to the thickness of annular member 58 such that when the elements of the magnetic structure 12 are arranged as shown in FIGS. 1 - 3, the upper end 60 of cylindrical member 52 will lie in substantially the same plane as the upper edge 62 of the annular member 58. The diameter of the annulus 59 is greater than the outside diameter of cylindrical member 52 by an amount equal to twice the desired width of the air gap 63 in which the coil 14 moves. The elements of the magnetic structure 12 are all preferably of a permanent magnetic material or a material having a high permeability, such as soft iron. Generally, it is preferred that the element 50 be of permanent magnetic material and the elements 52, 54 and 58 be of soft iron when minimum piston size and weight, low vibration, high speed and low work are required. If greater work is required, it is preferred that the part 52 be of permanent magnetic material for a given air gap and weight of magnetic material. A bearing 70 is positioned within the cylindrical member 52 for receiving a shaft 72. As best shown in FIG. 4, the windings 74 of the coil 14 are wound on a cylindrical coil form 76. Coil 14 is mounted onto the shaft 72 with shaft 72 being coaxial with coil 14. When shaft 72 is inserted into bearing 70, at least a portion of the coil form 76 will extend into the air gap 63. As current is caused to flow through the winding 74 of the coil to produce a magnetic field that interacts with the magnetic field within the airgap of the permanent magnet, the coil will move into the air gap, carrying shaft 72 with it. The direction of movement is, of course, determined by the direction of current flow for a given magnetic polarity. If a large number of ampere turns is produced by current flow through the coil, demagnetization of the permanent magnet can occur unless the coil moves into the structure as the current flows.

As the coil moves in the air gap with the motor running, it will reach a point of desired maximum excursion and must be returned to the opposite point of maximum excursion.

The contacts 42 and 44, in addition to providing electrical connection to the winding 74, also function to bias the coil to the desired position.

Figures 5, 6, 7:
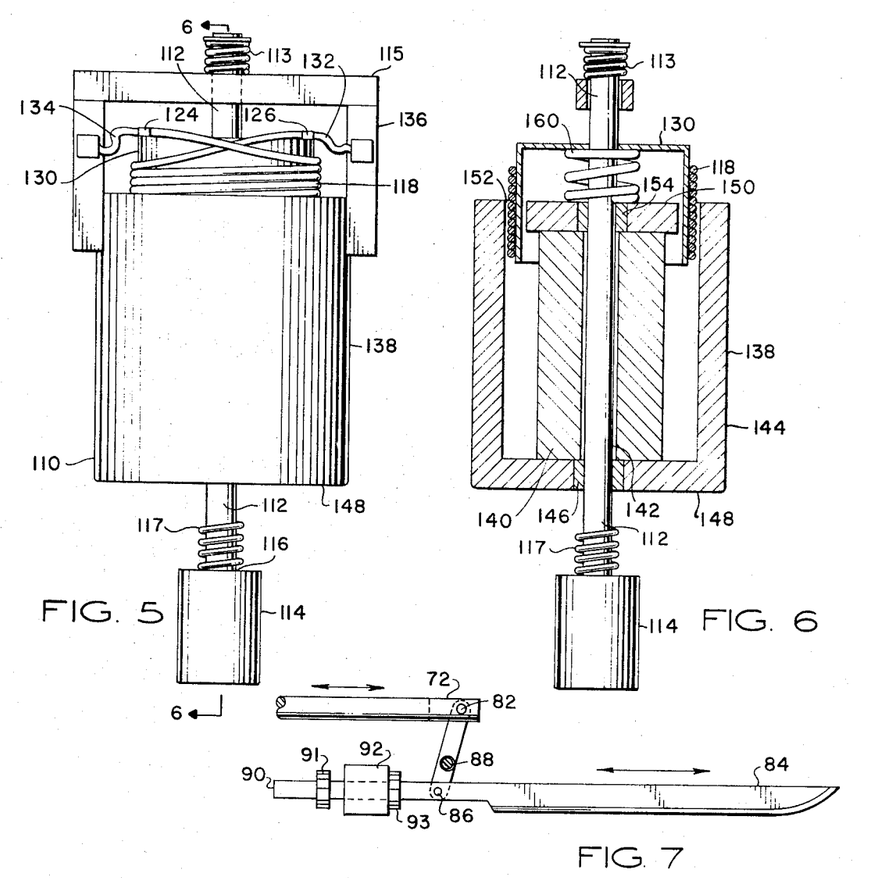
FIG. 5 is a front elevational view illustrating a second embodiment of the invention.
FIG. 6 is a view similar to FIG. 3 further illustrating the embodiment shown in FIG. 5.
FIG. 7 is a view illustrating the manner in which the motor of the present invention can be utilized to drive a blade.

A more preferred embodiment of the invention is shown in FIGS. 5 and 6 of the drawings and designated generally by the reference character 110. The apparatus 110 includes an elongated shaft 112 having working element 114 connected to one end 116 thereof. The motor of the present invention is especially useful with working elements in which either the force required to drive the shaft in one direction from the initial position to a displace position is greater than the force required to return the working element in the opposite direction from the displace position toward the initial position or the force required to produce reciprocating movement of the element 114 is substantially constant. Exemplary of such working elements would be a sawblade, a compactor, and many other devices of the character described. A coil 118 is carried by the shaft 112 with the leads 120 and 122 of the coil suitably being connected to terminals 124 and 126 mounted on a coil form 130. Terminals 124 and 126 are connected by flexible leads 132 and 134 to a bracket member 136 which is affixed to the magnetic structure 138.

The constructional details of the preferred embodiment of the apparatus are illustrated in greater detail in FIG. 6 of the drawings. The magnetic structure 138 includes a permanent magnet member 140 having an axial passageway 142 in which the shaft moves. The permanent magnet 140 is coaxially positioned within a cup-shaped member 144 of ferrous material. A bearing 146 is positioned coaxially in the base 148 of the cup member 144 for supporting the shaft. A disc-shaped member 150 which is also of ferrous material is mounted to the opposite end of the magnetic member with the diameter of the disc member 150 being slightly less than the inside diameter of the cup member 144 defining an air gap 152 therebetween. The member 150 includes a bearing 154 which is coaxial with the passageway 142 and the bearing 146. Winding 118 is wound on a coil form 130 connected to the shaft 112 such that the coil 118 and shaft 112 move as a unit. A spring 160 is positioned for biasing the shaft 112 in a direction to remove the coil 118 from the air gap. The coil is wound such that when unidirectional current of a desired polarity passes through the coil, the coil will be driven into the magnetic structure as a result of interaction of the magnetic field in the air gap 152 with the magnetic field of the coil produced as a result of such current flow. It will be noted, in this regard, that it is practical for the magnetic forces to drive the coil out of the air gap, in which event the spring would be positioned to bias the coil toward the air gap. However, the structure shown is preferred in that there is reduced tendency for the magnetic field produced by the coil to result in de-magnetization of the permanent magnet member of the magnetic structure.

As shown in FIG. 7, the shaft 72 can be coupled to a reciprocating load such as a knife blade 84 at point 86 through a lever arrangement rather than using a direct connection as shown in FIG. 5. Lever member 80 is suitably pivotally mounted about a centrally disposed point 88 such that movement of the coil away from the permanent magnet will cause the knife blade 84 to move in an opposite direction. The end 90 of knife blade 84 is suitably elongated and passes through a bearing member 92 which cooperates with lever member 80 to maintain alignment of the knife blade 84. Operation of the motor will, therefore, be effective to produce reciprocating motion of the knife blade 84, as would be suitable for cutting. Rings 91 and 93 limit the movement of the blade 84.

Mechanical stops such as the rings 91 and 93 can be used for limiting excursion, but generally are objectionable from the standpoint of noise created and reliability, as the striking forces become large. Changes in the load will result in a tendency for the stroke length to also vary, which tendency is restricted by the mechanical stops. Accordingly, when it is desired to maintain relatively constant stroke length with varying loads on the electromagnetic stroke, it is preferred that a pair of springs be used for limiting excursion of the shaft. Thus, as shown in FIG. 5 of the drawings, it is practical to mount a spring 113 on the shaft which engages the member 115 when the coil is driven into the air gap by the electromagnetic force to the desired extent. A second spring 117 is mounted on the shaft 112 to engage a different portion of the motor structure, such as the base of the cup member 148, when the shaft is moved in the opposite direction by the force stored in the spring 160. By varying the positions of the springs 113 and 117 on shaft 112, the excursion of the shaft can be controlled as well as the compression of the spring 110. It will be noted that the compression of the spring 160 in conjunction with the spring constants controls the amount of force exerted by the spring to return the shaft and coil away from the air gap. It is also practical when the springs 113 and 117 are used for limiting excursion of the shaft to design the coil and the control circuitry such that the electromagnetic force developed will be much greater than that required to compress the spring to the desired extent, assuring that adequate power will be available to drive the load as the load varies. It will be evident that in such instances the spring 113 used for limiting the excursion of the shaft when the coil is energized to drive the load and compress the spring 160 should be much stronger than the spring 160. Provision of the excursion limiting springs 113 and 117 promotes quiet operation of the motor and conserves a substantial amount of kinetic energy, particularly during conditions of light loads.

Figure 8:
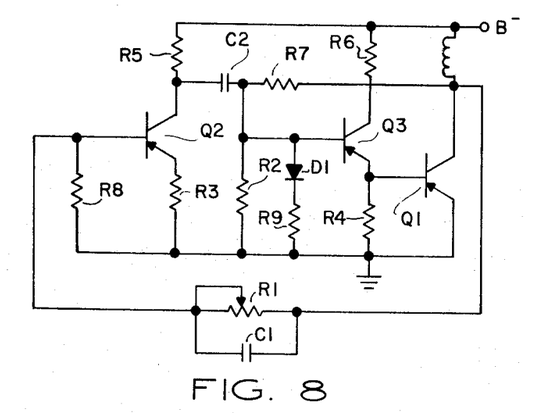
FIG. 8 is a schematic diagram illustrating one control circuit for use in practicing the present invention.

A control circuit for producing the flow of direct current through the coil 74 in a desired direction and at desired times is shown in FIG. 8 of the drawings. It can be seen to comprise a transistor $Q_1$ whose collector and emitter are connected in a series circuit with the coil 74 and a source of direct current supply B⁻. Current will flow through the winding 74 of coil 14, with the amount of current flow being a function of the conductivity state of the transistor $Q_1$.

The control circuit of FIG. 8 can also be seen to comprise a capacitor $C_1$ and resistor $R_1$ that are connected in parallel between the collector of transistor $Q_1$ and the base of transistor $Q_2$. The collector of transistor $Q_2$ is connected through capacitor $C_2$ and resistor $R_2$ to the positive terminal of battery 28, which is denoted as being at ground potential. The juncture between capacitor $C_2$ and resistor $R_2$ is connected to the base of transistor $Q_1$. The emitter of transistor $Q_2$ is connected to common through resistor $R_3$, and the emitter of transistor $Q_3$ is connected to common through resistor $R_4$. The collector of transistor $Q_2$ is connected to the negative side of battery 26 through resistor $R_5$, and the collector of transistor $Q_3$ is connected to the negative side of battery 26 through resistor $R_6$. The base of transistor $Q_3$ is connected to common through diode $D_1$ and to the collector of transistor $Q_1$ through resistor $R_7$. The base of transistor $Q_2$ is connected to common through resistor $R_8$.

When the motor is running, the control circuitry shown schematically in FIG. 8 is effective to bias transistors $Q_1$ and $Q_3$ off upon the coil 14 reaching its point of maximum excursion into the magnetic structure 12 (bottom dead center), momentarily preventing flow of current through the coil 14 and permitting the coil 14 to be returned to its opposite dead center position by the spring. Bottom dead center will be reached when the force exerted by the spring and the load becomes equal to the force exerted by the coil for the current flowing at the time. During this period of time, transistor $Q_2$ will be biased on. Upon the coil attaining a maximum excursion out of the air gap (hereinafter referred to as the top dead center position), transistor $Q_2$ will be biased off and transistors $Q_3$ and $Q_1$ will be biased to the conductive state with transistor $Q_1$ preferably being biased into saturation. Top dead center will be reached when the force exerted by the load becomes equal to the force exerted by the spring as substantially no force is exerted by the coil. When transistor $Q_1$ is biased conductively, current will flow through coil 14 to again cause the coil to be forced into the air gap to the bottom dead center position.

The current flowing through coil 14 is a function of the battery voltage, the d.c. resistance of the coil, the conductivity state of transistors $Q_1$ and $Q_3$, and the charge on capacitor $C_2$ as controlled by the back EMF generated in coil 14. In accordance with the circuit of FIG. 8, the amount of base current flowing initially in transistor $Q_1$, as the coil moves from top dead center to bottom dead center is sufficient to bias the transistor such that the emitter-collector current will be limited only by the maximum current that can flow through the coil.

Figure 9:
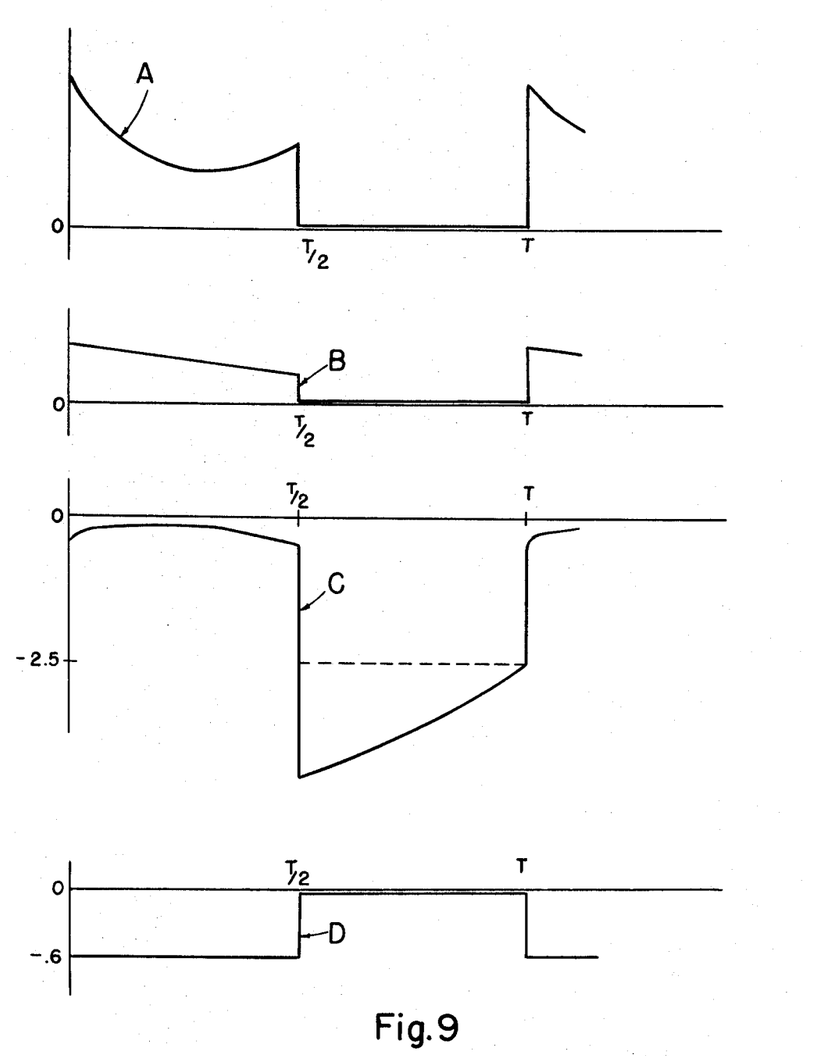
FIG. 9 is a group of curves illustrating various wave forms present in the control circuitry of FIG. 8.

Thus, when transistor $Q_1$ is first biased on, it is biased such that approximately the maximum amount of collector current will flow in transistor $Q_1$, as illustrated in Curve A of FIG. 9. The collector of transistor $Q_1$ will be very near ground potential and transistor $Q_2$ will either be biased off, or biased on so slightly that it will not substantially affect charging of capacitor $C_2$. It will be noted that the base current flowing in transistor $Q_1$ flows through the emitter-collector circuit of transistor $Q_3$ and that the base current of transistor $Q_3$ flows to charge capacitor $C_2$. The base current flowing in transistor $Q_1$ will, therefore, be an initially high level, but will slowly decrease as shown in Curve B of FIG. 9, due to charging of capacitor $C_2$. As the coil moves from its top dead center position to the bottom dead center position, a back EMF voltage will be produced in the coil as its windings pass through the air gap of the permanent magnet, causing the collector current to decrease as shown in Curve A of FIG. 9. However, as the force exerted by the spring increases, the speed of the coil will decrease, resulting in an increase in the collector current of transistor $Q_1$ due to the decrease in back EMF. At bottom dead center, the coil will momentarily stop its movement, resulting in the absence of back EMF voltage.

The time constant for the charge path of capacitor $C_2$ and the current amplification factor of transistors $Q_1$ and $Q_3$ are chosen such that at this time the relationship between the decreasing base current of transistor $Q_1$ and increasing collector current of transistor $Q_1$ is such that transistor $Q_1$ is only slightly saturated. The collector of transistor $Q_1$ will accordingly become more negative, as shown in Curve C of FIG. 9, resulting in an increase in the conductivity of transistor $Q_2$. It will be noted in this connection that transistor $Q_3$ provides current amplification of the charging current of capacitor $C_2$ to insure that the base current of transistor $Q_1$ derived from charging of capacitor $C_2$ will be sufficient to produce saturation of transistor $Q_1$. If the current flowing to charge capacitor $C_2$ is sufficient to bias transistor $Q_1$ into saturation, it is practical to connect the base of transistor $Q_1$ directly to capacitor $C_2$ with other minor circuit changes, permitting elimination of transistor $Q_3$.

Figure 10:
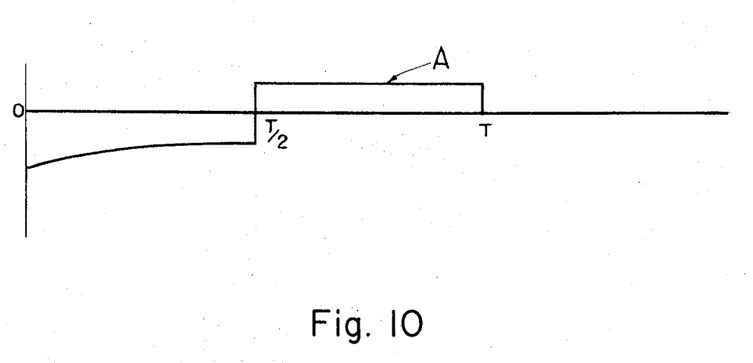
FIG. 10 is a group of curves illustrating additional wave forms present in the control circuitry of FIG. 8.

When transistor $Q_2$ is biased to a higher conductivity state, it will provide a path for discharge of capacitor $C_2$ through diode $D_1$, resistor $R_3$ to the end of resistor $R_3$ which is connected to the emitter of transistor $Q_2$. At this point, the discharge current splits into two components — one component flows through the emitter-base of transistor $Q_2$, resistor $R_1$, diode $D_2$, the coil 14, resistor $R_5$ and back into the capacitor $C_2$. This component drives the transistor $Q_2$ as a common base made such that a second component of discharge current, slightly smaller than the first, flows through the emitter collector of transistor $Q_2$ and back into capacitor $C_2$. As the capacitor $C_2$ is discharged, the base of transistor $Q_3$ will become positive, as shown in FIG. 10, causing transistor $Q_3$ to be biased off. When transistor $Q_3$ is biased off, transistor $Q_1$ will also be biased off and current will no longer flow through coil 14. It will be noted that the less conductive transistor $Q_1$ becomes, the more conductive transistor $Q_2$ will become biased. Similarly, the more conductive that transistor $Q_2$ becomes, the less conductive that transistors $Q_3$ and $Q_1$ will be biased. Accordingly, once transistor $Q_2$ begins to turn on, an avalanche effect is produced to cause a very fast switching in the state of conductivity of transistor $Q_1$ which controls the flow of current through coil 74. Thus, as shown in Curve C of FIG. 9, the collector of transistor $Q_1$ will change from a potential only slightly negative to a potential substantially equal to the voltage of the batteries 26 and 28 and thereafter will become more negative due to the back EMF generated as the coil moves back to its initial bottom dead center position.

When the coil is returned to its initial or top dead center position by the spring, a back EMF will no longer be generated in the coil and the transistor $Q_2$ will become much less conductive. Upon this occurrence, the collector of transistor $Q_2$ will become more negative and capacitor $C_2$ will begin to be charged through the base-emitter circuit of transistor $Q_3$, biasing transistor $Q_3$ on. As a result of the flow of base current in transistor $Q_3$ to charge capacitor $C_2$, current will commence to flow in the emitter- collector circuit of transistor $Q_3$, providing base current for the transistor $Q_1$. A small amount of base current flowing in transistor $Q_1$ will result in a substantial decrease in the negative potential of the collector of transistor $Q_1$, causing transistor $Q_2$ to become less conductive and causing both transistors $Q_3$ and $Q_1$ to become more conductive. Thus, the decrease in the conductivity of transistor $Q_2$ occasioned by a drop in the back EMF voltage generated in coil 74 when the coil returns to the top dead center position will produce an avalanche effect that results in transistor $Q_1$ being biased to saturation and transistor $Q_2$ being biased off.

Figure 11:
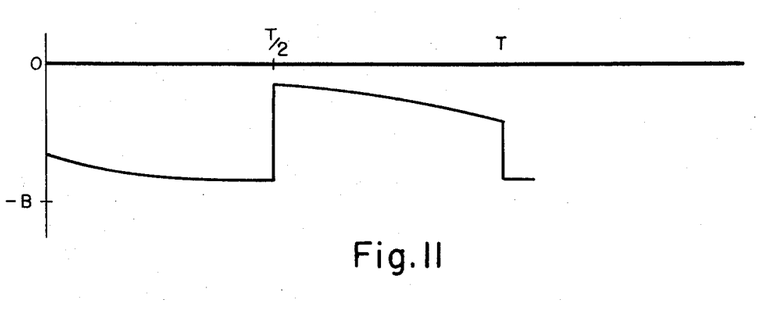
FIG. 11 is a curve illustrating still another wave form appearing in the control circuit of FIG. 8.

The above operations can perhaps more fully be understood by reference to the curves of FIGS. 10 and 11 of the drawings. Thus, the voltage appearing at the base of transistor $Q_3$ will initially be at the maximum negative level but will become more positive as a result of the charging of capacitor $C_2$. At the time the transistor $Q_2$ is biased conductively permitting a discharge of capacitor $C_2$, the voltage appearing at the base of transistor $Q_3$ will be positive by the amount of forward voltage drop of diode $D_1$ and resistor $R_9$, all shown in FIG. 10. The voltage appearing at the base of transistor $Q_2$ will be substantially the same form as the voltage appearing at the collector of transistor $Q_1$. The voltage appearing at the collector of transistor $Q_2$ will be as shown in FIG. 11. Thus, when transistor $Q_2$ is not conductive, its collector can be at a negative potential equal to the battery voltage less the drop across resistor $R_5$ as capacitor $C_2$ charges. When the transistor $Q_2$ becomes conductive, its collector will become much more positive due to the voltage drop across resistor $R_5$, and will only be slightly negative during the conductive period of the transistor if transistor $Q_2$ saturates. If transistor $Q_2$ does not saturate, the potential appearing at its collector will essentially be of the form of the back EMF.

The base current of transistor $Q_1$ is as shown in Curve B of FIG. 9. When transistor $Q_1$ is conductive, its base will be more negative than its emitter by the amount of the drop across the emitter base junction, causing the base of transistor $Q_1$ to be at approximately −0.6 volts for germanium transistors when the transistor $Q_1$ is conductive. When transistor $Q_1$ is biased off, on the other hand, its base will be at very near ground potential, all as shown in Curve D of FIG. 9.

It will be noted that the capacitor $C_1$ speeds up the turn on and turn off times of transistor $Q_1$. It will also be noted that when the coil is being returned from bottom dead center to top dead center, the back EMF generated during this period of time will cause the collector of transistor $Q_1$ to be more negative than the battery supply, resulting in an increase in the amount of base current flowing through transistor $Q_2$. The collector of transistor $Q_2$ will be only slightly negative, resulting in discharge of capacitor $C_2$ through diode $D_1$, resistor $R_9$, and the two discharge paths through transistor $Q_2$. When top dead center is reached and the back EMF generated disappears, transistor $Q_2$ will be biased less conductive, and its collector will become more negative. Capacitor $C_2$ will be charged through the base emitter circuit of transistor $Q_3$. Since capacitor $C_2$ is permitted to charge from a voltage essentially determined by the amplitude and duration of the back EMF towards the battery voltage, the base current of transistors $Q_1$ and $Q_3$ are dynamically and regeneratively controlled. This is extremely important in that it permits acceleration of the motor.

It can be seen from the foregoing description that it is important that current be applied to the coil at one extreme of its traverse and removed from the coil or reversed at the opposite extreme of the traverse. In accordance with a preferred embodiment of the control circuitry disclosed herein, this necessary control function is derived as a function of the back EMF developed in the coil as it moves. In this connection, it will be noted that it is desirable that the transistor $Q_2$ not be biased into saturation in the absence of back EMF. During the flyback part of the cycle, the potential appearing at the collector of transistor $Q_1$ will become more negative than the potential of the batteries as a result of the back EMF generated in the coil. This, in turn, causes transistor $Q_1$ to be biased to a more conductive state and increases the depth of discharge of capacitor $C_2$. When top dead center is reached and the back EMF disappears, capacitor $C_2$ charges through the base-emitter circuit of transistor $Q_3$ rather than discharging through resistor $R_2$ as the collector of transistor $Q_3$ becomes more negative. This, of course, permits greater base current to flow in transistor $Q_3$ by permitting capacitor $C_2$ to charge from a relatively low voltage toward the battery voltage as it affects the conductive state of transistor $Q_1$ and permits and promotes acceleration of the motor.

Figure 12:
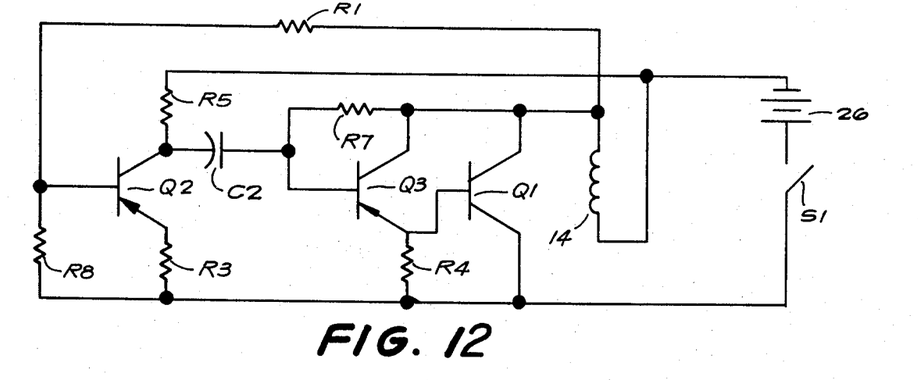
FIG. 12 is a schematic diagram illustrating another control circuit.
Figure 13:
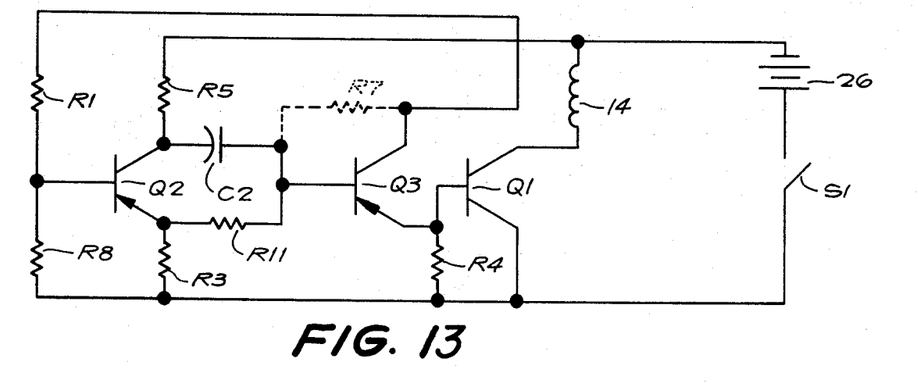
FIG. 13 is a schematic diagram illustrating still another control circuit.
Figure 14:
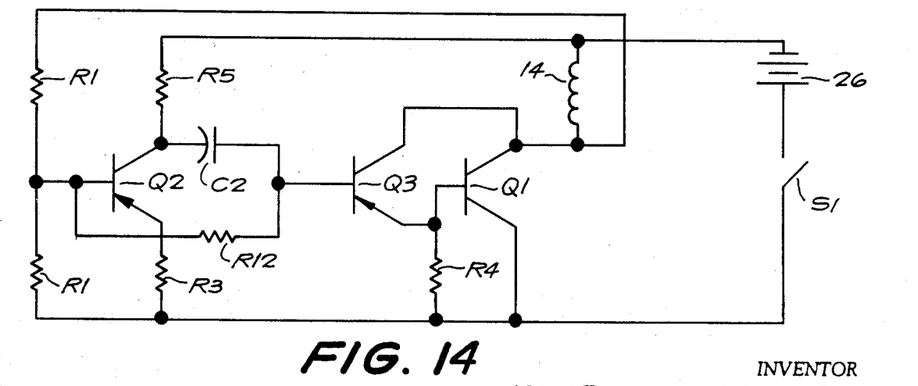
FIG. 14 is a schematic diagram illustrating still another control circuit.

Alternative control circuits in which different discharge paths for capacitor $C_2$ are utilized are shown in FIGS. 12 through 14 of the drawings. However, the control circuits of FIGS. 12 through 14 have in common with the control circuitry of FIG. 8 the fact that they include a first transistor which is connected by its emitter and collector electrodes in series with the coil and a source of direct current supply voltage, a second transistor having emitter base and collector electrodes and a capacitor. The conductivity state of the second transistor is controlled as a function of potential appearing at one of the electrodes of the first transistor, the state of charge of the capacitor is controlled as a function of the conductivity state of the second transistor and the conductivity state of the first transistor is controlled as a function of the state of charge of the capacitor. It will be noted, in this connection, that reactance elements other than capacitors can be used, such as an inductor, although, in general, it has been found that capacitor is preferred due to considerations of size and simplicity of circuit design.

FIGS. 12 – 14 also indicate the use of transistor $Q_3$ and $Q_1$ as a composite transistor eliminating the resistor $R_6$ of FIG. 8. Operation of transistors $Q_3$ and $Q_1$ as a composite pair results in economy of cost by eliminating resistor $R_6$ and economy of power since the current taken by transistor $Q_3$ also passes through the coil. There is a significant power savings even though transistor $Q_1$ operates at a higher saturation drop in the composite connection.

The circuit of FIG. 12 can be seen to be the same schematically as the circuit of FIG. 8 except for the elimination of diode $D_1$, the elimination of capacitor $C_1$ and the elimination of resistors $R_2$, $R_6$ and $R_9$ with the collector of transistor $Q_3$ being connected directly to the collector of transistor $Q_1$. It is important to note further that in the circuit of FIG. 12, the discharge path for capacitor $C_2$ is through a path comprising a resistor $R_7$, the coil 14 and resistor $R_5$. The capacitor is not discharged through the base-emitter or emitter-collector electrodes of transistor $Q_2$, but the charge on the capacitor is controlled as a function of the conductivity state of transistor $Q_2$ in that the charge on the capacitor is controlled as a function of the potential appearing at the collector of transistor $Q_2$, which in turn varies as a function of conductivity state of transistor $Q_2$, which in turn varies as a function of conductivity state of transistor $Q_2$. Accordingly, even though the discharge path is different, the conductivity state of the transistor $Q_2$ controls the state of charge of the capacitor. As described with reference to FIG. 8, the resistor $R_7$ also functions as a starting resistor by providing a path for discharge of capacitor $C_2$, when transistor $Q_2$ is not conductive, through resistor $R_5$ and coil 14.

The control circuit of FIG. 13 is substantially the same as that of FIG. 12, the difference being that resistor $R_7$ is eliminated and resistor $R_{11}$ is connected between the emitter of transistor $Q_2$ and the base of transistor $Q_3$. In the embodiment of the invention shown in FIG. 13 of the drawings, the capacitor $C_2$ discharges through one path comprising the emitter collector electrodes of transistor $Q_2$ and resistor $R_{11}$ and through a second path comprising resistor $R_{11}$, resistor $R_1$, the emitter-base electrodes of the transistor $Q_2$, the coil 14 and resistor $R_5$. Again, even through the discharge path for capacitor $C_2$ is different, the basic consideration of the state of charge of the capacitor being controlled as a function of the conductivity state of the capacitor $C_2$ remains. In FIG. 13 the starting cycle may be set up from resistor $R_{11}$ and the potential appearing at the emitter of transistor $Q_2$. Resistor $R_7$ may be connected as shown in phantom to provide improved starting characteristics, but is not necessary.

The control circuit of FIG. 14 is similar to that of FIG. 13, the difference being that the resistor $R_{11}$ is eliminated and resistor $R_{12}$ is connected between the base of transistor $Q_2$ and the base of transistor $Q_3$. In this instance, the discharge path for capacitor $C_2$ is through resistor $R_{12}$, resistor $R_1$, coil 14 and resistor $R_5$. Again, the state of charge of the capacitor is determined by the potential appearing at the collector of transistor $Q_2$.

It is important to note that the control circuit controls the supply of current to the coil as a function of the back EMF generated in the coil. Accordingly, current is not supplied to the coil for predetermined periods of time as would be true of motor drive circuits using conventional multi-vibrators as controllers. Rather, the supply of current to the coil is controlled as a function of the back EMF voltage generated by the coil. Because of this important distinction, it is virtually impossible to stall the motor of the present invention. Rather, as the load on the working element 14 increases the frequency of the reciprocating cycles of the working elements will increase with the stroke being shortened. The above results from the fact that under such increased load conditions the distance that the shaft will move before the sum of the force exerted by the load and the spring becomes equal to the force generated as a result of flow of current through the coil is shortened. Upon this occurrence, the flow of current through the emitter collector electrode of transistor 104 is effectively interrupted until movement of the working element under the force exerted by the biasing element or spring has stopped. In most applications for working elements of the character described, such is desirable in that some useful work will be accomplished even though the power available is less than that required to supply a desired amount of work At all times, the maximum benefit is obtained from the power available rather than a stalled condition existing in which substantially no useful work is performed.

The force produced by the coil should be greater than the sum of the force produced by the spring at the top dead center position and force required to drive the working element in one direction toward the bottom dead center position. Similarly, the force exerted by the spring in the top dead center should be greater than that required to drive the working element in the opposite direction. The distance the working element moves will be a function of load, the spring characteristics and the extent to which the forces producing motion in a particular direction initially exceeds the minimum required.

Although the invention has been described with reference to particular preferred embodiments thereof, many changes and modifications will become apparent to those skilled in the art in view of the foregoing description which is intended to be illustrative and not limiting of the invention defined in the appended claims.

What is claimed is:

1. A reciprocating apparatus comprising:
   a. shaft means for connection to a working element;
   b. resilient means operative for biasing such shaft in an opposite direction from a displaced position toward an initial position;
   c. the force exerted by said resilient means when said shaft is at the displaced position being at least as great as the force required to drive the working element in the opposite direction from the displaced position toward the initial position;
   d. a coil carried by said shaft means;
   e. a magnetic structure including an air gap in which the coil moves rectilinearly;
   f. control means responsive to the back EMF generated in the coil for selectively supplying unidirectional current to said coil of a polarity to produce movement of the working element in the one direction from the initial position to the displaced position and comprising a first transistor connected by its emitter and collector electrodes in series with said coil and a source of d.c. supply voltage, a reactance means, a second transistor, means responsive to the potential appearing at one of the emitter and collector electrodes of the first transistor for controlling the conductivity state of the second transistor for controlling the state of charge of the reactance means and means responsive to the state of charge of the reactance means for controlling the conductivity of the first transistor.
   g. the force produced as a result of interaction between the magnetic field in the air gap of the magnetic structure and the magnetic field of the coil resulting from the flow of the unidirectional current when the working element is moved in said one direction being at least as great as the sum of the force exerted by the resilient means in the opposite direction and the force required to drive the working element in the one direction.

2. Apparatus as defined in claim 1 wherein the resilient means is a compressible load.

3. Apparatus as defined in claim 1 wherein the resilient means is a spring.

4. Apparatus as defined in claim 1 wherein the shaft is connected to the working element through a lever arrangement.

5. Apparatus as defined in claim 1 wherein the force exerted by the resilient means varies from a first level at the displaced position to a lesser second level at the initial position and the control means supplies a greater flow of current through the coil at the initial position when movement of the coil in the opposite direction stops upon the force exerted by the element becoming equal to the force exerted by the spring in the initial position and until movement in the one direction stops upon the force exerted by the coil becoming equal to the sum of the forces exerted by the resilient means in the displaced position and the force exerted by the working element as the coil moves in the one direction than the flow of current during movement of the coil in the opposite direction.

6. Apparatus as defined in claim 1 wherein the working element is of a character such that the force required to drive the working element in the one direction is greater than the force required to drive the element in the opposite direction.

7. Apparatus as defined in claim 1 wherein the resilient means biases the coil away from the magnetic structure.

8. Apparatus as defined in claim 6 wherein the working element is a saw blade.

9. Apparatus as defined in claim 6 wherein the working element is a knife blade.

10. Apparatus as defined in claim 6 wherein the working element is a pump piston and the resilient means is a fluid compressed by the pump piston.

11. A motor as defined in claim 1 further including means for connecting the base electrode of said second transistor to one of the emitter and collector electrodes of the first transistor.

12. A motor as defined in claim 1 wherein said reactance means is a capacitor.

13. A motor as defined in claim 1 wherein said reactance means is a capacitor and including means connecting said second transistor by its emitter electrode in a discharge path for said capacitor and means for supplying base current to said first transistor as said capacitor is charged.

14. A motor as defined in claim 15 wherein said means for supplying includes a third transistor having base, emitter and collector electrodes and means connecting said third transistor to amplify the charge current of said capacitor and to apply the amplified current to drive said first transistor.

15. A motor as defined in claim 1 wherein the potential appearing at the one electrode varies as a function of the back EMF generated as said coil moves in a magnetic field.

16. A direct current motor as defined in claim 1 wherein said reactance means is a capacitor having two terminals and further including means connecting one terminal of the capacitor to one of the emitter and the collector electrodes of the second transistor and means connected to the capacitor terminals for providing charge and discharge paths for said capacitor whereby the charge on the capacitor varies as a function of the potential appearing at the one electrode of the second transistor.

17. A direct current motor as defined in claim 16 wherein the means connected to the capacitor terminals for providing a charge path for said capacitor includes the base-emitter circuit of one of a third transistor and said first transistor.

18. A direct current motor as defined in claim 16 wherein the potential appearing at the one electrode varies as a function of the conductivity state of the second transistor and further including means connected to the other terminal of the capacitor for supplying base current to the first transistor as said capacitor is charged.

19. A motor as defined in claim 1 further including resilient means for limiting the traverse of the shaft when current is supplied to said coil.

20. A motor as defined in claim 1 further including additional resilient means for controlling the shaft excursion.

21. A motor as defined in claim 20 wherein additional the resilient means includes a second spring effective at the end of the traverse of the shaft in the one direction to limit movement, said second spring being stronger than the first mentioned resilient means.

22. A reciprocating apparatus comprising:
   a. shaft means for connection to a working element;
   b. resilient means operative for biasing such shaft in an opposite direction from a displaced position toward an initial position;
   c. the force exerted by said resilient means when said shaft is at the displaced position being at least as great as the force required to drive the working element in the opposite direction from the displaced position toward the initial position;

d. a coil carried by said shaft means;
e. a magnetic structure including an air gap in which the coil moves rectilinearly;
f. control means responsive to the back EMF generated in the coil for selectively supplying unidirectional current to said coil of a polarity to produce movement of the working element in the one direction from the initial position to the displaced position and comprising: a first transistor connected by its emitter and collector electrodes in series with said coil and a source of d.c. supply voltage, a reactance means, a second transistor, means responsive to the potential appearing at one of the emitter and collector electrodes of the first transistor for controlling the conductivity state of the second transistor for controlling the state of charge of the reactance means and means responsive to the state of charge of the reactance means for controlling the conductivity of the first transistor;
g. the force produced as a result of interaction between the magnetic field in the air gap of the magnetic structure and the magnetic field of the coil resulting from the flow of the unidirectional current when the working element is moved in the said one direction being at least as great as the sum of the force exerted by the resilient means in the opposite direction and the force required to drive the working element in the one direction;
h. the force exerted by the resilient means being variable from a first level at the displaced position to a lesser second level at the initial position; and
i. said control means providing a flow of current through the coil which is greater than that provided as the coil moved in the opposite direction at the initial position when movement of the coil in the opposite direction stops upon the force exerted by the element becoming equal to the force exerted by the spring in the initial position and at least until movement in the one direction stops upon the force exerted by the coil becoming equal to the sum of the forces exerted by the resilient means in the displaced position and the force exerted by the working element as the coil moves in the one direction.

23. Apparatus as defined in claim 22 wherein the resilient means is a compressible load.

24. Apparatus as defined in claim 22 wherein the resilient means is a spring.

25. Apparatus as defined in claim 22 further including additional resilient means for controlling the shaft excursion.

* * * * *

UNITED STATES PATENT OFFICE
CERTIFICATE OF CORRECTION

Patent No. 3,676,758                    Dated July 11, 1972

Inventor(s) Joseph W. Mathews

It is certified that error appears in the above-identified patent and that said Letters Patent are hereby corrected as shown below:

Column 10, line 28 "15" should appear -- 13 --.

Signed and sealed this 12th day of December 1972.

(SEAL)
Attest:

EDWARD M. FLETCHER, JR.                 ROBERT GOTTSCHALK
Attesting Officer                        Commissioner of Patents